US012154094B2

(12) United States Patent
Spender

(10) Patent No.: US 12,154,094 B2
(45) Date of Patent: *Nov. 26, 2024

(54) SYSTEMS AND METHODS TO PROVIDE USER VERIFICATION IN A SHARED USER ENVIRONMENT VIA A DEVICE-SPECIFIC DISPLAY

(71) Applicant: Worldpay, LLC, Symmes Township, OH (US)

(72) Inventor: Charlotte Spender, Tonbridge (GB)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,041

(22) Filed: Nov. 2, 2022

(65) Prior Publication Data

US 2023/0297996 A1 Sep. 21, 2023

Related U.S. Application Data

(63) Continuation of application No. 17/570,192, filed on Jan. 6, 2022, now Pat. No. 11,699,144, which is a
(Continued)

(51) Int. Cl.
G06Q 20/32 (2012.01)
G06Q 20/40 (2012.01)
G06T 19/00 (2011.01)

(52) U.S. Cl.
CPC ..... *G06Q 20/3278* (2013.01); *G06Q 20/4012* (2013.01); *G06Q 20/4014* (2013.01); *G06T 19/006* (2013.01)

(58) Field of Classification Search
CPC ...... G06Q 20/12; G06Q 20/40; G06Q 20/385; G06Q 20/425; G06Q 20/4014; G06Q 20/40145; G06Q 20/20; G06Q 20/3224; G06Q 20/36; G06Q 20/322; G06Q 20/42; G06Q 20/32; G06Q 20/3276; G06Q 20/3278; G06Q 20/4012; G06Q 20/3274; G06Q 20/3674; G06Q 20/409; G06Q 20/102; G06Q 20/3223; G06Q 20/3226; G06Q 20/3255; G06Q 20/341; G06Q 20/363; G06Q 20/382; G06Q 20/3821; G06Q 20/4018; G06Q 20/18; G06Q 20/325; G06Q 20/327; G06Q 20/352; G06Q 20/38215; G06Q 20/388; G06Q 20/4016;
(Continued)

(56) References Cited

U.S. PATENT DOCUMENTS 8,904,501 B2 * 12/2014 Luke ...................... G16H 10/65
713/168
10,482,664 B1 * 11/2019 Schlosser ........... G06Q 20/3224
(Continued)

*Primary Examiner* — Hani M Kazimi
*Assistant Examiner* — Sanjeev Malhotra
(74) *Attorney, Agent, or Firm* — Bookoff McAndrews, PLLC

(57) ABSTRACT

A method of generating a shared augmented reality payment authentication entry interface includes detecting a first consumer device and a second consumer device; prompting a display of a first augmented reality payment authentication interface at the first consumer device; and prompting a display of a second augmented reality payment authentication interface at the second consumer device.

20 Claims, 6 Drawing Sheets

Related U.S. Application Data continuation of application No. 16/251,890, filed on Jan. 18, 2019, now Pat. No. 11,282,066.

(58) Field of Classification Search
CPC ............ G06Q 20/405; G06Q 20/4097; G06Q 30/0641; G06Q 30/06; G06Q 30/0639; G06Q 30/02; G06Q 30/0207; G06Q 30/0601; G06Q 30/0623; G06Q 30/0631; G06Q 30/0643; G06Q 30/0222; G06Q 40/00; G06Q 40/02; G06Q 40/08; G06Q 50/01; G06F 3/017; G06F 21/31; G06F 21/34; G06F 3/011; G06F 2221/2129; G06F 21/32; G06F 21/36; G06F 3/04886; G06F 21/00; H04L 63/0861; H04L 2209/56; H04L 63/0853; H04L 63/126; H04L 9/3234; H04L 63/08; H04L 2209/805; H04L 63/10; H04L 2463/102; G06T 19/006; H04W 12/06; H04W 12/0608; H04W 4/02; G06K 9/0071; G06K 9/22; G02B 2027/0138; G02B 2027/014
USPC ..... 705/26.41, 39, 41, 44, 67, 72, 14.14, 71, 705/75; 235/382; 713/168, 176
See application file for complete search history.

(56) References Cited

U.S. PATENT DOCUMENTS

| | | | | |
|---|---|---|---|---|
| 2010/0198712 A1* | 8/2010 | Benisti | | G06Q 10/107 713/176 |
| 2011/0108623 A1* | 5/2011 | Hammad | | G06Q 20/40 235/382 |
| 2011/0119155 A1* | 5/2011 | Hammad | | G06Q 20/42 235/382 |
| 2013/0144785 A1* | 6/2013 | Karpenko | | G06Q 20/425 705/44 |
| 2013/0218721 A1* | 8/2013 | Borhan | | G06Q 30/02 705/26.41 |
| 2013/0304637 A1* | 11/2013 | McCabe | | G06Q 40/02 705/39 |
| 2014/0061302 A1* | 3/2014 | Hammad | | G06Q 20/12 235/382 |
| 2014/0067674 A1* | 3/2014 | Leyva | | G06Q 20/20 705/44 |
| 2015/0012426 A1* | 1/2015 | Purves | | G02B 27/017 705/41 |
| 2015/0317625 A1* | 11/2015 | Hammad | | G06Q 20/385 705/67 |
| 2015/0363808 A1* | 12/2015 | Maggio | | G06Q 30/0212 705/14.14 |
| 2016/0019539 A1* | 1/2016 | Hoyos | | G06Q 20/327 705/75 |
| 2016/0027017 A1* | 1/2016 | Chitragar | | G06Q 20/3829 705/71 |
| 2016/0092877 A1* | 3/2016 | Chew | | G06Q 20/4012 705/72 |
| 2016/0259929 A1* | 9/2016 | Cash | | G07F 7/084 |
| 2016/0283946 A1* | 9/2016 | Laporta | | G06Q 20/40145 |
| 2016/0321624 A1* | 11/2016 | Brunner | | G06Q 20/102 |
| 2016/0364723 A1* | 12/2016 | Reese | | G06Q 20/202 |
| 2016/0379211 A1* | 12/2016 | Hoyos | | H04L 63/0861 705/75 |
| 2017/0017957 A1* | 1/2017 | Radu | | G06Q 20/4012 |
| 2017/0078879 A1* | 3/2017 | da Cruz Pinto | | H04L 63/10 |
| 2017/0300883 A1* | 10/2017 | Bethke | | G06Q 30/0239 |
| 2017/0300910 A1* | 10/2017 | Bethke | | G06Q 30/0222 |
| 2017/0364920 A1* | 12/2017 | Anand | | H04L 63/0861 |
| 2017/0372312 A1* | 12/2017 | Laporta | | G06Q 20/401 |
| 2018/0068313 A1* | 3/2018 | Van Os | | G06Q 20/367 |
| 2018/0157336 A1* | 6/2018 | Harris | | G06V 40/28 |
| 2018/0157820 A1* | 6/2018 | Adams | | G06F 3/017 |
| 2018/0158053 A1* | 6/2018 | Adams | | G02B 27/017 |
| 2018/0158060 A1* | 6/2018 | Adams | | H04W 12/06 |
| 2018/0247483 A1* | 8/2018 | Lindsay | | G07F 7/1008 |
| 2018/0270048 A1* | 9/2018 | Bar-El | | G06F 21/6281 |
| 2018/0308095 A1* | 10/2018 | Hammad | | G06Q 20/409 |
| 2018/0315045 A1* | 11/2018 | Leyva | | G06Q 20/388 |
| 2018/0315050 A1* | 11/2018 | Hammad | | G06Q 20/3226 |
| 2018/0315115 A9* | 11/2018 | Kuoh | | G07G 1/0036 |
| 2018/0330376 A1* | 11/2018 | Briggs | | G06Q 20/3223 |
| 2018/0365680 A1* | 12/2018 | Davis | | G06Q 20/407 |
| 2019/0026729 A1* | 1/2019 | Kalgi | | G06Q 20/3276 |
| 2019/0050547 A1* | 2/2019 | Welsh | | G06Q 10/10 |
| 2019/0080325 A1* | 3/2019 | Pourfallah | | G06Q 20/3276 |
| 2019/0080332 A1* | 3/2019 | MacKinnon | | G06Q 30/0637 |
| 2019/0080345 A1* | 3/2019 | Durvasula | | A63F 13/79 |
| 2019/0087888 A1* | 3/2019 | Loganathan | | G07F 9/0235 |
| 2019/0156404 A1* | 5/2019 | Gabriele | | G06Q 30/0601 |
| 2019/0188672 A1* | 6/2019 | Charles | | G06Q 20/3224 |
| 2019/0197553 A1* | 6/2019 | Conway | | H04L 63/0861 |
| 2019/0244248 A1* | 8/2019 | Purves | | G06Q 20/40145 |
| 2019/0303915 A1* | 10/2019 | Hammad | | G06Q 20/12 |
| 2019/0325454 A1* | 10/2019 | Carlson | | G06Q 20/42 |
| 2019/0377417 A1* | 12/2019 | Friedman | | H04L 63/0861 |
| 2020/0034753 A1* | 1/2020 | Hammad | | G06Q 10/00 |
| 2020/0058029 A1* | 2/2020 | Spitz | | G07F 9/001 |
| 2020/0082463 A1* | 3/2020 | Carroll | | G06Q 30/0643 |
| 2020/0094133 A1* | 3/2020 | Rose | | G06Q 20/385 |
| 2021/0065239 A1* | 3/2021 | Hylton | | G06V 20/20 |

\* cited by examiner

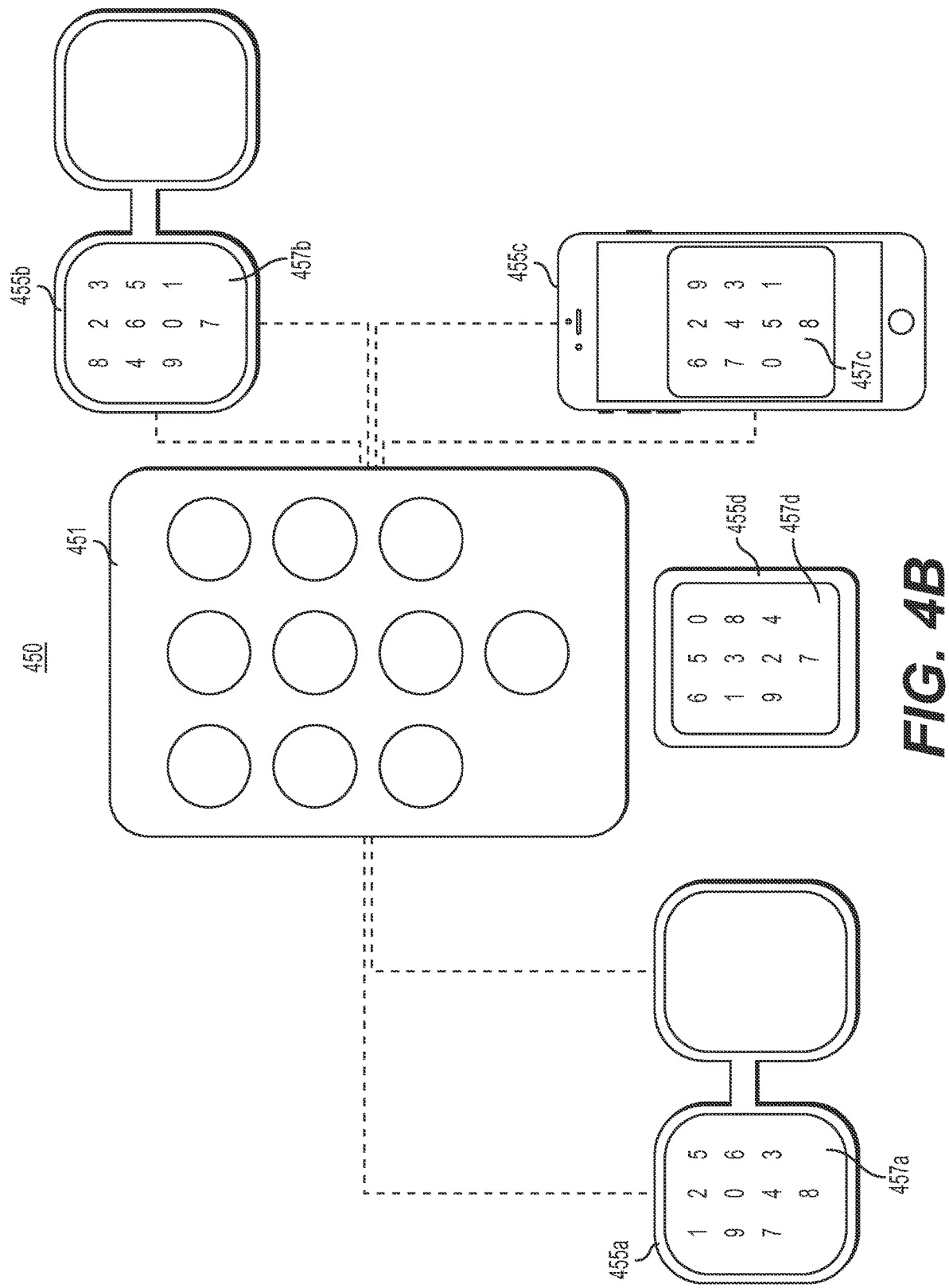

SYSTEMS AND METHODS TO PROVIDE USER VERIFICATION IN A SHARED USER ENVIRONMENT VIA A DEVICE-SPECIFIC DISPLAY

CROSS-REFERENCE TO RELATED APPLICATION(S)

This patent application is a continuation of and claims the benefit of priority to U.S. Non-provisional patent application Ser. No. 17/570,192, filed on Jan. 6, 2022, which is a continuation of and claims the benefit of priority to U.S. Non-provisional patent application Ser. No. 16/251,890, now U.S. Pat. No. 11,282,066, filed on Jan. 18, 2019, the entirety of which is incorporated herein by reference.

TECHNICAL FIELD

Various embodiments of the present disclosure relate generally to electronic payment processing and, more particularly, to generating payment authentication entry interfaces for shared user environments.

BACKGROUND

Traditionally, PIN pads are often used for customers to enter payment credentials or verify their identity for payment processing. Standard PIN pads may have a known arrangement of alphanumeric characters in the form of 12 buttons arranged in 4 rows and 3 columns. The first row may include numbers 1, 2, and 3; the second row may include the numbers 4, 5, and 6; the third row may include numbers 7, 8, and 9; and the last row may include "*", 0, and "#." Each of the numbers may also have associated letters of the alphabet in a standard format.

Users often provide payment credentials (e.g., personal identification number ("PIN numbers"), Card Verification Value (CVVs), etc.) while in a shared environment, in the presence of other people. The standard PIN pad configuration means that an individual watching a user may easily detect or infer a user's PIN number by watching the user's selection of buttons and correlating the user's selections with standard positions of alphanumeric characters in a PIN pad.

Accordingly, there is a need for systems and methods that allow users to enter payment credentials in a shared environment, using interfaces that are not discernable to other users. There is also a need for a way for users in a group to enter their payment credentials such that their payment credentials are not discernable to each other. The present disclosure is directed to overcoming one or more of these above-referenced challenges.

SUMMARY OF THE DISCLOSURE

According to certain aspects of the disclosure, systems and methods are disclosed for generating payment authentication entry interfaces for shared user environments.

In accordance with another embodiment, a system is disclosed for generating payment authentication entry interfaces for shared user environments, the system comprising: a data storage device storing instructions for generating payment authentication entry interfaces for shared user environments in an electronic storage medium; and a processor configured to execute the instructions to perform a method including: detecting a first consumer device and a second consumer device; prompting a display of a first augmented reality payment authentication interface at the first consumer device; and prompting a display of a second augmented reality payment authentication interface at the second consumer device.

In one embodiment, a computer-implemented method is disclosed for generating payment authentication entry interfaces for shared user environments, the method comprising: detecting a first consumer device and a second consumer device; prompting a display of a first augmented reality payment authentication interface at the first consumer device; and prompting a display of a second augmented reality payment authentication interface at the second consumer device.

In accordance with another embodiment, a non-transitory machine-readable medium storing instructions that, when executed by the server, causes the server to perform a method for detecting a first consumer device and a second consumer device; prompting a display of a first augmented reality payment authentication interface at the first consumer device; and prompting a display of a second augmented reality payment authentication interface at the second consumer device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that users may provide payment authentication credentials in the presence of other individuals, without having the credentials being detectable to the other individuals. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A and 4B depict payment authentication entry interfaces for shared user environments, according to one or more embodiments.

DETAILED DESCRIPTION OF EMBODIMENTS

Figure 1:
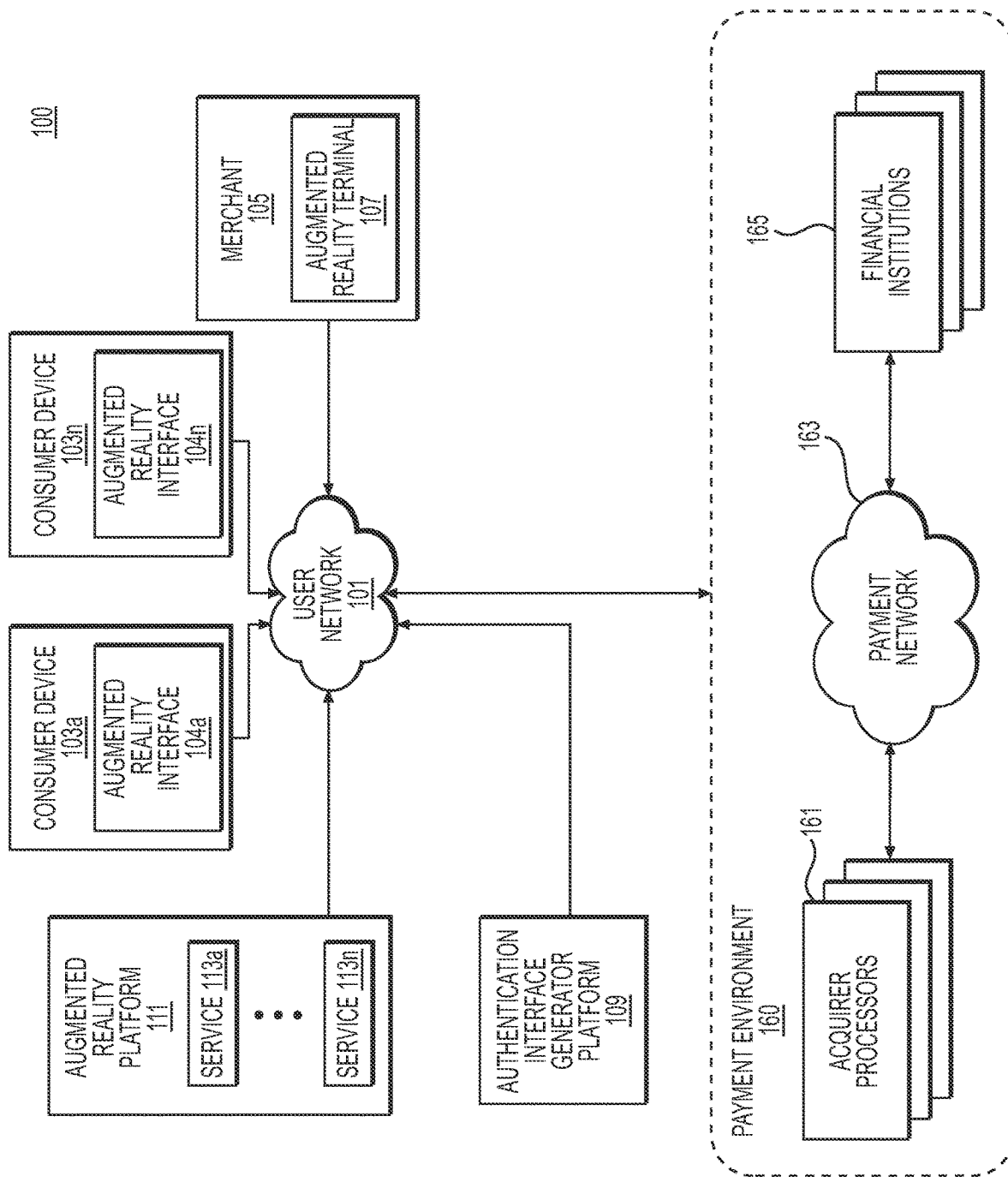
FIG. 1 depicts a block diagram of an environment and user network for generating payment authentication entry interfaces for shared user environments, according to one or more embodiments.

Various embodiments of the present disclosure relate generally to an augmented reality or virtual reality electronic payment infrastructure and to generating payment authentication entry interfaces for shared user environments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle" or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

While some of the embodiments below refer to payment credential entry as being user's entry of their PIN number entry, no aspect of the present disclosure is specifically limited to the payment credential being a PIN number. It is intended that the following description encompasses the use of the present disclosure with any form of payment credential, including Card Verification Value (CVV), a payment vehicle number (e.g., a credit card number), a password, or any other type of payment credential verifying the user's identity through a plurality of characters, including, for example, alphanumeric characters, emojis, symbols, pictures, thumbnails, shapes, graphics, gifs, animations, etc.

While some of the embodiments below refer to usage in an augmented reality setting, no aspect of the present disclosure is specifically limited to augmented reality. It is intended that the following description encompasses the use of the present disclosure in any virtual reality setting as well.

Traditionally, merchants and other store owners may accept user payment credentials (e.g., PIN numbers) via point of sale (POS) devices that have buttons arranged in a standardized format of alphanumeric characters. The standardized format typically comprises an arrangement of 12 buttons positioned in 4 rows and 3 columns. This standard arrangement of alphanumeric characters provides easy detectability of a user's payment credentials from any nearby users. Such detectability is especially problematic in a shared physical space environment (e.g., a public space, ride share, or shared gaming console), where individuals other than the user may infer a user's payment credentials.

The systems and methods provide an improvement to the current problem of detectable payment credentials in a shared environment, by presenting different interactive displays to different users in the environment. The interactive displays may be comprised of augmented reality overlays on a shared physical environment, or user-specific virtual reality overlays in a shared virtual reality environment. The overlays/displays may be visible only to the user. Accordingly, even if users observe another user providing inputs to enter their payment credentials, the payment credentials may not be discernable because the inputs do not correspond to a known or standardized format.

Figure 4A:
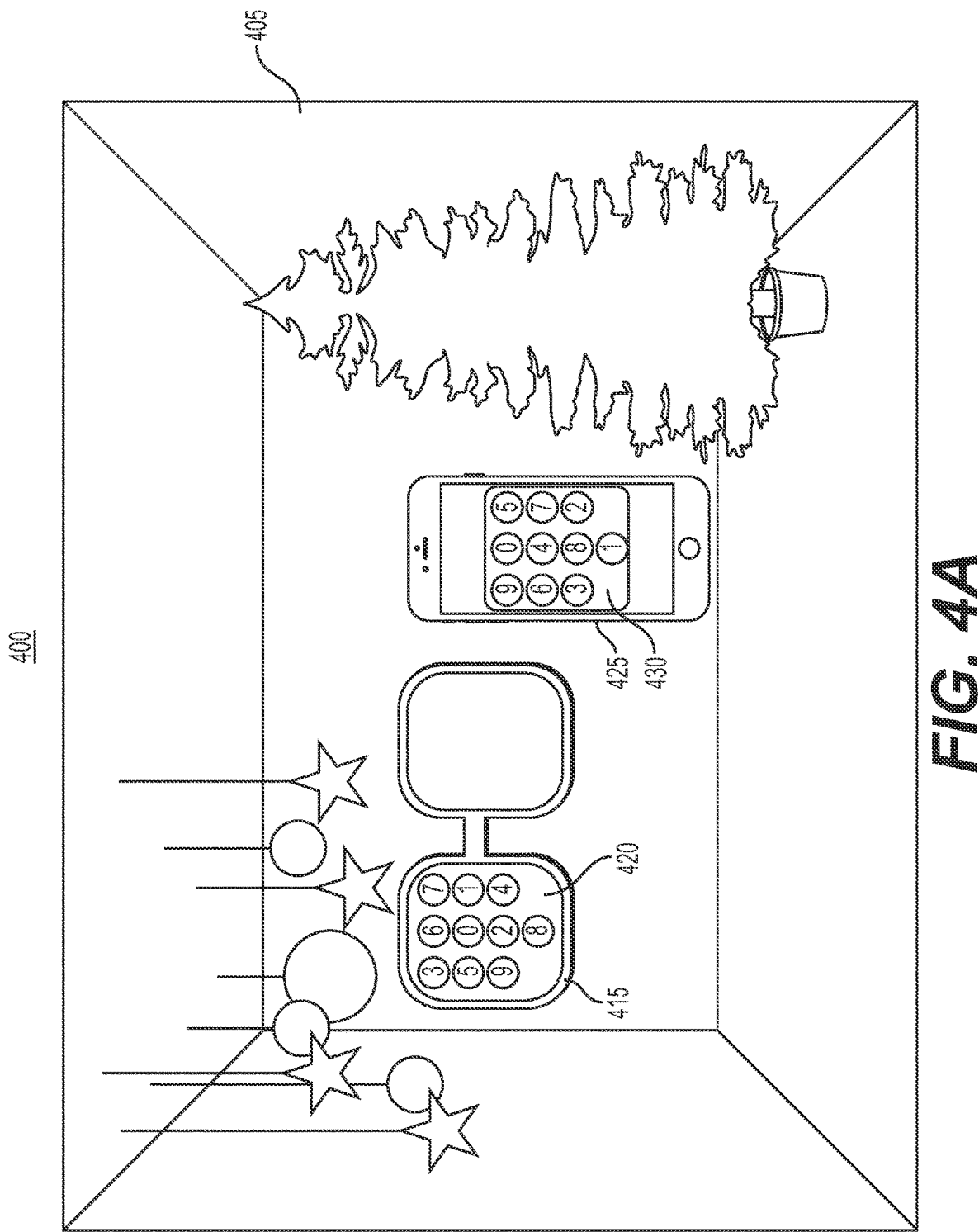

One example of the augmented reality display may refer to a scenario where multiple users are in the same physical space, e.g., a room. Upon receiving an indication that at least one of the users wishes to make a payment, a payment authentication interface may be generated at each user's personal device. The indication that at least one user wishes to make a payment may be associated with a physical space (e.g., a location of a room as shown in FIG. 4A). For instance, if a group of friends wants to go to a gym class together, an augmented reality interface may appear on each person's personal device as they approach the classroom. The interface may be shown through each user's personal device as a unique augmented reality overlay on the room. The interface may be different on each user's personal device. The payment authentication interface may prompt each respective user to enter payment prior to entering the classroom.

Alternately or in addition, the indication that at least one user wishes to make a payment may be associated with one or more objects. For instance, user selection or interaction with a blank "PIN pad" (as shown in FIG. 4B) may prompt a payment authorization request. An augmented reality interface may then be projected or overlaid, for instance, over the object. An "object" in this instance may include, for example, physical object(s) or good(s), digital good(s), physical services, web or digital services, etc. As shown at FIG. 4B, the augmented reality overlay/projection may be different at each user's user device, thus ensuring secure entry of payment credentials.

Yet another exemplary indication of a payment request may include a detected proximity between one or more user devices. For example, a first user and a second user may be team members in a game. The first user may be associated with a first device and the second user may be associated with a second device. Detection of the first device and the second device being in the same setting (e.g., within a 1 meter radius of one another) may initiate one overlay at the first device and a second overlay at the second device. Each user may input payment credentials into their respective overlays, for instance, to pay to start the game.

In use, each payment authentication interface/overlay may receive a user's input of payment credentials to authenticate payment. The payment authentication interface may be different at each user's device (e.g., as shown in FIGS. 4A and 4B). Accordingly, even if users can see each other inputting payment credentials, viewers cannot discern what characters each user is selecting as input.

Referring now to FIG. 1, a block diagram is depicted of an exemplary environment 100 and user network 101 for authenticating payment transactions in virtual reality environments, according to an exemplary embodiment of the present disclosure. Environment 100 may include a plurality of consumer devices (e.g., consumer device 103a and consumer device 103n). The consumer devices 103a and 103n may include one or more augmented reality (AR) or virtual reality (VR) consumer products, e.g., a VR headset, VR or augmented reality (AR) eyewear, a VR immersive system, a smartphone, mobile phone, tablet computer, laptop, portable computer, watch, wearable device, or a combination thereof.

Each consumer device may be associated with (or belong to) a different user. Further, each consumer device may be configured to provide an augmented reality interface. For example, consumer device 103a may provide an augmented reality interface 104a and consumer device 103n may provide an augmented reality interface 104n. Augmented reality interface 104a may show various characters for a user's selection in a different visual arrangement from that of augmented reality interface 104n. Further, augmented reality interface 104a may receive a user's input of a payment credential for consumer device 103a, and augmented reality interface 104n may receive its respective user's input of a payment credential for consumer device 103n. The payment credential may include a PIN number or other secure code.

The display or creation of a payment authentication interface may be initiated by a merchant 105, authentication interface generator platform 109, augmented reality platform 111, or a combination thereof. The merchant 105 may operate at least one augmented reality terminal 107. (Terminal 107 may alternately be a virtual reality terminal.) Terminal 107 may be in contact with each consumer device 103a and consumer device 103n. In one embodiment, terminal 107 may provide or prompt the creation of augmented reality interface 104a at consumer device 103a, and augmented reality interface 104n at consumer device 103n.

The authentication interface generator platform 109 and/or the augmented reality platform 111 may facilitate or enhance the generation of the interfaces 104a and 104n. For example, authentication interface generator platform 109 may randomize the order of characters for each of the interfaces 104a and 104n. Augmented reality platform 111 may host one or more services 113a-113n (or services 113). The augmented reality platform 111 and services 113 may detect cues or triggers in a physical environment that prompt AR displays. Alternately or in addition, platform 111 and services 113 may be comprised of a virtual reality platform with services that provide immersive VR experiences. The interfaces 104a and 104n may then be displayed as overlays in an immersive VR environment.

Figure 2:
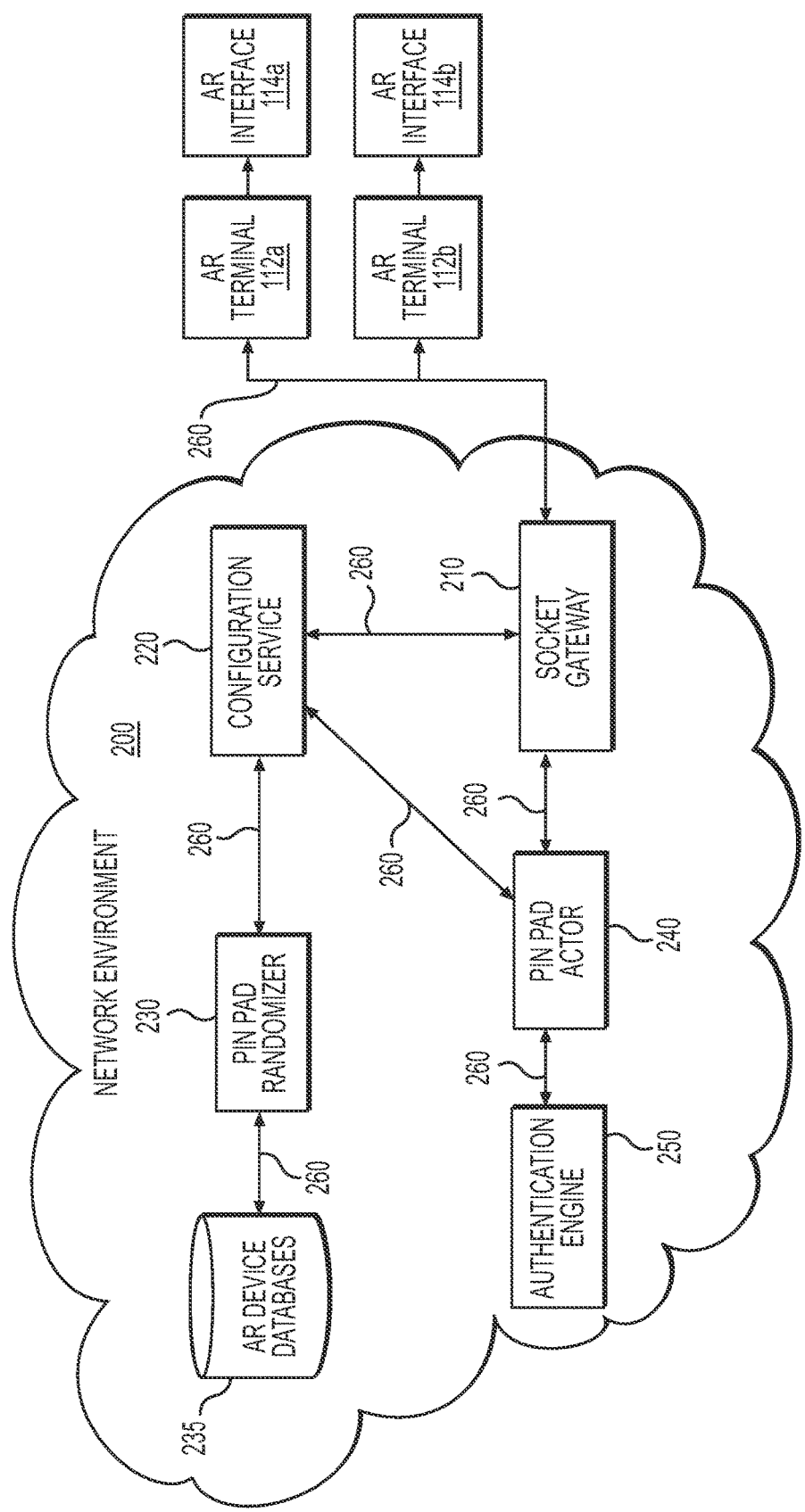
FIG. 2 depicts an exemplary system infrastructure for generating payment authentication entry interfaces for shared user environments using a computer network, according to one or more embodiments.

Once a consumer submits payment information via consumer device 103, virtual reality terminal 107 may send a payment request to a payment environment 160. The payment request may be sent by way of a computer network 163 to an acquirer processor 161. Alternatively, such a request may be sent by a component that controls a flow of a transaction, such as an authentication engine 250, as depicted in FIG. 2. Acquirer processor(s) 161 may request, by way of payment network 163, an electronic transfer of funds from the received funds to the financial institution(s) 165 associated with merchant 105 Merchant 105 may provide an infrastructure for processing electronic payment requests.

FIG. 2 depicts an exemplary system infrastructure for generating randomized virtual reality payment authentication entry interfaces, according to one or more embodiments. As shown in FIG. 2, an infrastructure 200 processing electronic payment requests may include a plurality of augmented reality terminals, e.g., AR terminal 112a and AR terminal 112b. Each AR terminal may be associated with an AR interface. For example, AR terminal 112a may be associated with AR interface 114a. AR interface 114a may be comprised of various displays, including interactive interface 104a of consumer device 103a of FIG. 1. Similarly, AR terminal 112b may be associated with AR interface 114b. AR interface 114b may, for example, supply various AR interfaces at consumer device 103n, including interactive interface 104n of consumer device 103n.

Authentication response (e.g., PIN number entry) for a user of consumer device 103a may be received via interface 104a (or interface 114a), and authentication response for a user of consumer device 103n may be received via interface 104n (or interface 114n). Each AR terminal may be in communication with an infrastructure 200 via socket gateway 210. Socket gateway 210 may send commands to each of the VR terminals of each consumer device, to generate the AR interfaces.

Infrastructure 200 may further include a configuration service 220, a (PIN "pad") randomizer 230, and an AR device database 235. Configuration service 220 may, if necessary, configure each interface 114 upon connection of each AR terminal 112 to the infrastructure 200. Configuration service 220 may comprise an individual software vendor specializing in storing or verifying payment credentials. For example, configuration service 220 may work with randomizer 230 to generate randomized interfaces 114 for each consumer to use in entering their payment credentials. AR device database 235 may maintain configuration data associating each AR terminal 112 and interface 114. In this way, AR device database 235 and configuration service 220 may ensure that the display provided by randomizer 230 is compatible with the AR terminal 112 and consumer device 103 (not shown), and able to display each AR interface 114 independently to each consumer device 103.

In one embodiment, infrastructure 200 may further include PIN pad actor 240 and authentication engine 250. PIN pad actor 240 may determine one or more prompts for an interface 114. The prompts may include locations or objects in a physical space. For example, interface 114 may be displayed as a group of users approaches a selected room or a selected object (e.g., a calculator, chalkboard, desk, blank PIN pad, tree, monitor, etc.). Other prompts may include selections or actions from one or more users. For example, a user may initiate display of interface 114 or interface 104 via a gesture or vocal/audio command. Another exemplary prompt may include the users being positioned in a selected configuration (e.g., in the back seat of a vehicle, in a pre-set formation, etc.).

In other words, configuration service 220 may prompt PIN pad actor 240 to generate a display or overlay to show at each interface 114, and randomizer 230 may interact with actor 240 to generate a display/overlay with randomized components or icons for each interface 114. Authentication engine 250 may compare payment credentials received through each interface 114, with stored payment credentials of the configuration service 220. If the received payment credentials match the stored credentials, authentication engine 250 may approve a payment request. If a match does not occur, authentication engine 250 may reject a transaction payment request and/or prompt generation of another interface 114 for the respective user to try again.

According to one or more embodiments, the components of infrastructure 200 may be connected by a computer network 260, such as, for example a local area network (LAN) or a wireless network, such as, for example, a Wi-Fi network. However, other network connections among the components of infrastructure 200 may be used, such as, for example, a wide area network (WAN), the internet, or the cloud. According to one or more embodiments, the components of infrastructure 200 may operate to generate various interface(s) 114 that a user may use in a VR or AR environment to enter payment authentication credentials. Methods of generating payment authentication entry interfaces for shared environments according to one or more embodiments will be discussed with respect to FIGS. 3-FIG. 5 below.

Any suitable system infrastructure may be put into place for generating randomized virtual reality payment authentication entry interfaces. FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
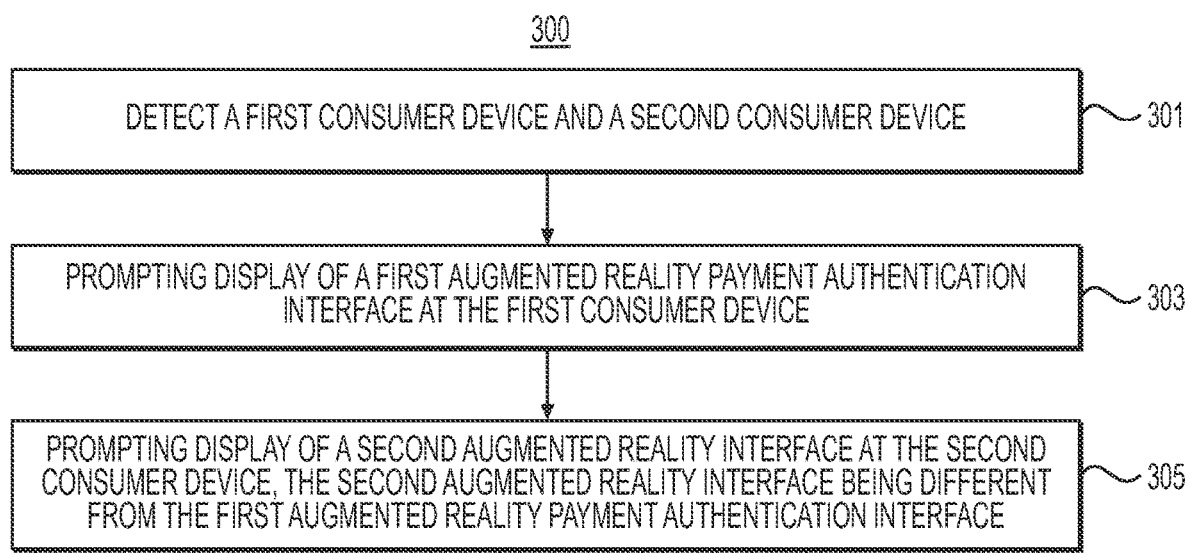
FIG. 3 depicts a flowchart of a method for generating payment authentication entry interfaces for shared user environments, according to one or more embodiments.

FIG. 3 illustrates a method 300 for verifying payment. In particular, the verification method of method 300 includes detecting a first consumer device and a second consumer device (e.g., step 301). The first and/or second consumer device may include any of the following: a VR headset, VR or augmented reality (AR) eyewear, a smartphone, mobile phone, tablet computer, laptop, portable computer, watch, wearable device, or a combination thereof. The first consumer device and second consumer device may be different types of devices. For instance, the first consumer device may include AR eyewear (e.g., eyewear 415 of FIG. 4A) and the second consumer device may include a portable computing device (e.g., mobile phone 425 of FIG. 4A). The first consumer device and second consumer device may also be associated with different users.

In one embodiment, step 301 may be performed in response to receiving a request for payment authorization of one or more objects. For example, one or more users may be in the same physical space (e.g., room 405 of FIG. 4A), and they may wish to purchase an object in the physical space. The request for payment authorization may relate to a single object for purchase between the first consumer device and the second consumer device. For example, two users sharing a physical space or an immersive virtual reality experience may both wish to purchase item(s), or the same item, while in the space/experience. In such a scenario, a request for payment may be received (e.g., from a consumer device). Each of the users may signal a wish to make a purchase in the form of some user input. For instance, a user having AR eyewear may provide a voice command (e.g., an audio input of "purchase Tree No. 2356"), a gesture (e.g., a "grab," swipe, point, wave, etc.), or other physical input to initiate a transaction request. The request may also be submitted from the user scanning a bar code, quick response ("QR") code, etc.

The request for payment may result in a request for payment authorization being issued from a consumer device (e.g., consumer device 103 of FIG. 1, eyewear 415 of FIG. 4A, or mobile phone 425 of FIG. 4A, etc.). In one embodiment, the request for payment authorization may be received over a computer network (e.g., user network 101) by the authentication interface generator platform 109, augmented reality platform 111, a mobile app (e.g., installed on a consumer device 103), etc. Payment authorization may entail a desire to verify each user's identity prior to authorizing payment. The verification of the user's identity may entail a request for each of the users to enter payment credentials, e.g., a personal identification number (PIN). Accordingly, step 301 may include detecting and/or identifying the device(s) associated with the request for payment authorization and the rest of method 300 may include generating interactive AR interfaces for each of the users to securely enter their payment credentials.

Step 303 may include prompting a display of a first augmented reality payment authentication interface at the first consumer device (e.g., interface 415 of eyewear 415 at FIG. 4A). Step 305 may include prompting a display of a second augmented reality payment authentication interface at the second consumer device, the second augmented reality payment authentication interface being different from the first augmented reality payment authentication interface (e.g., interface 430 of mobile phone 425 of FIG. 4A). The difference of the first augmented reality payment authentication interface from the second augmented reality payment authentication interface may ensure that each of the users may securely enter their payment credentials in into their respective interfaces. In contrast with current PIN pads where alphanumeric characters are arranged in a known order and observers may infer a user's payment credentials by watching their character selections, the differences between the payment interfaces ensures that observers/other users cannot infer a user's payment credentials (e.g., as shown by FIG. 4B discussed in more detail below). In one embodiment, steps 303 and 305 of prompting the display of the first augmented reality payment authentication interface and the display of a second augmented reality payment authentication interface may be performed in response to the request for payment authorization.

In one embodiment, the first augmented reality payment authentication interface and the second augmented reality payment authentication interface may each comprise a randomized display of alphanumeric characters, e.g., as shown by interfaces 420 and 430 at FIG. 4A, and interfaces 455a-455d of FIG. 4B). In particular, the first augmented reality payment authentication interface and the second augmented reality payment authentication interface may each depict a plurality of alphanumeric characters positioned in randomized placements in an augmented reality (or virtual reality) environment. For example, the numerals 0, 1, 2, 3, 4, 5, 6, 7, 8, and 9 may be placed randomly in an arrangement with three rows, three columns, and one number underneath the three rows and three columns. While FIGS. 4A and 4B depict the interfaces as including numerals in the arrangement described above, the interfaces may include any characters or symbols, arranged in any manner or scattered across any location of an augmented reality or virtual reality space.

In one embodiment, the first augmented reality payment authentication interface and the second augmented reality payment authentication interface may each comprise an augmented reality display or an augmented reality overlay of alphanumeric characters positioned in a randomized order in a physical environment (e.g., as shown in FIG. 4A), or an augmented reality overlay of alphanumeric characters positioned in a randomized order projected onto a physical object (e.g., as shown in FIG. 4B). In particular, FIG. 4A depicts a physical room 405 (or virtual reality environment/room 405). A first user's consumer device may include augmented reality eyewear 415, displaying a first augmented reality payment authentication interface 420. A second user in room 405 may access mobile phone 425, which may display second augmented reality payment authentication interface 430. Interface 420 and interface 430 may differ, so that the first and second user cannot detect each other's payment credentials as they select numerals from their respective interfaces.

FIG. 4B depicts an environment 450 as including a physical PIN pad 451. Various users may be present in environment 450, and each user may be associated with one consumer device. For example, eyewear 455a, eyewear 445b, eyewear 445c, and tablet 455d may each belong to different users. The users may each see different overlays of characters when viewing pad 451. The user of eyewear 455a will see interface 457a; the user of eyewear 445b will see interface 457b; the user of mobile device 455c will see interface 457c; and the user of tablet 455d will see interface 457d. Because each of the users is seeing different (and possibly randomized) overlays/displays of characters, their payment credentials are not detectable to each other or other observers. While the exemplary displays shown in FIGS. 4A and 4B include alphanumeric characters, the characters in the displays and overlays may include any characters, including alphanumeric characters, emojis, symbols, pictures, thumbnails, shapes, graphics, gifs, animations, etc., or a combination thereof.

Once the interfaces are displayed, payment credentials may be received from a first user using the first augmented reality payment authentication interface at the first consumer device, and payment credentials may be received from a second user using the second augmented reality payment authentication interface at the second consumer device. Payment credentials may be received via user input, e.g., a gesture, drag and drop motion, a grabbing motion, a wave, a click, a point, etc. In one embodiment, payment credentials may be stored by a user device or mobile app and associated with a user payment account or profile. If the received payment credentials match stored payment credentials, payment authorization messages may be provided. A payment may thus be made to complete the transaction. If the received payment credentials do not match stored payment credentials, payment authorization may be denied. Alternately or in addition, additional payment authentication interface(s) may be provided. The payment authentication interfaces may increase in difficulty as a user's payment credentials fail to match stored credentials, as the transaction amount (e.g., price or payment amount of a transaction) increases, or as trust between users is low (e.g., trust may be low if the users are strangers, but high if the users are teammates in a virtual reality game).

Increased difficulty may involve elevated complexity, for example, with the placement of the characters, the proximity of each character to one another, the size of graphics showing the characters, the frequency that the placement of the characters is changed, or a combination thereof. For example, characters may be shown in a "PIN pad" configuration, scattered as icons throughout an augmented reality or VR environment, and/or hidden in occluded spaces of an AR/VR environment as exemplary levels of increasing difficulty. Another layer of difficulty may involve changing the overlay each time (or every other time) a user selects a character. The change may include a randomization or reshuffling of characters in the interface such that the interface is updated each time a user selects a character in the overlay. The characters may also move or be animated to move about a VR or AR environment.

Figure 5:
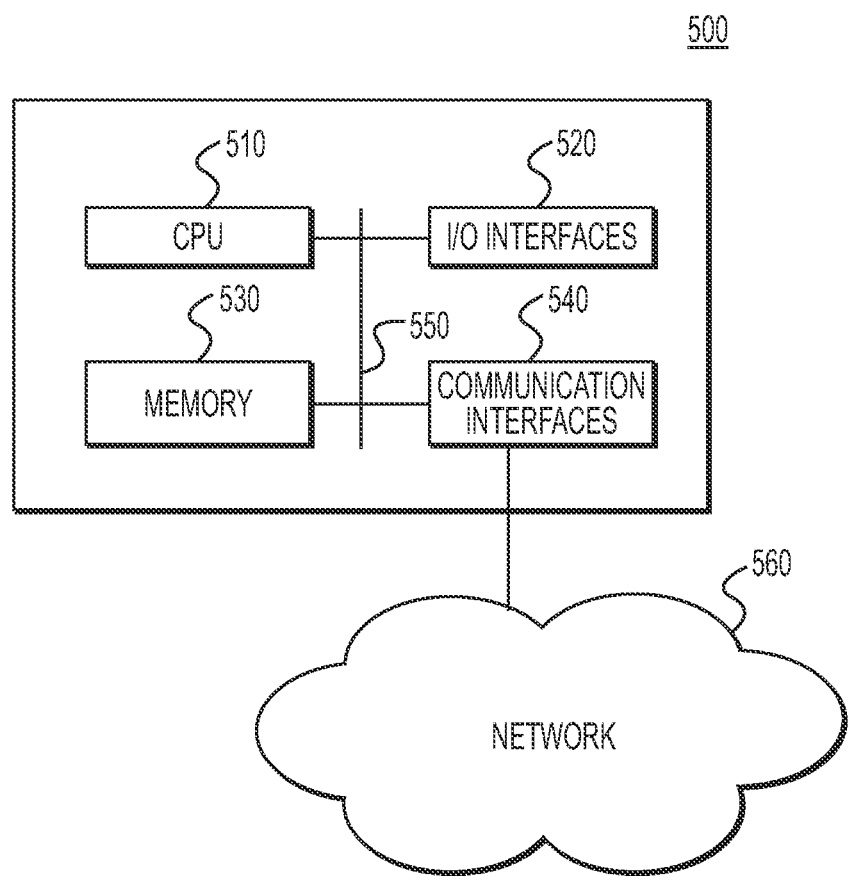
FIG. 5 is a block diagram of an example computing environment, according to one or more embodiments.

The systems and processes described above may be performed on or between one or more computing devices, e.g. configuration service. FIG. 5 illustrates an example computing device. A computing device 500 may be a server, a computing device that is integrated with other systems or subsystems, a mobile computing device such as a smart phone, a cloud-based computing ability, and so forth. The computing device 500 may be any suitable computing device as would be understood in the art, including without limitation, a custom chip, and embedded processing device, a tablet computing device, a back-office system of a merchant 105, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 500 may include a processor 510 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 500 may also include one or more memories 530, for example read-only memory (ROM), random access memory (RAM), cache memory associated with the processor 510, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 510, or memories 530 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 540 may be configured to transmit to, or receive data from, other computing devices 500 across a network 560. The network and communication interfaces 540 may be, for example, an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 540 may include wire data transmission links such as Ethernet and TCP/IP. The communication interfaces 540 may include wireless protocols for interfacing with private or public networks 560. For example, the network and communication interfaces 608 and protocols may include interfaces for communicating with private wireless networks such as Wi-Fi network, one of the IEEE 802.11x family of networks, or another suitable wireless network. The network and communication interfaces 540 may include interfaces and protocols for communicating with public wireless networks 560, using for example wireless protocols used by cellular network providers, including Code Division Multiple Access (CDMA) and Global System for Mobile Communications (GSM). A computing device 500 may use network and communication interfaces 540 to communicate with hardware modules such as a database or data store, or one or more servers or other networked computing resources. Data may be encrypted or protected from unauthorized access.

In various configurations, the computing device 500 may include a system bus 610 for interconnecting the various components of the computing device 500, or the computing device 500 may be integrated into one or more chips such as programmable logic device or application specific integrated circuit (ASIC). The system bus 550 may include a memory controller, a local bus, or a peripheral bus for supporting input and output devices 520, and communication interfaces 560. Example input and output devices 520 include keyboards, keypads, gesture or graphical input devices, motion input devices, touchscreen interfaces, one or more displays, audio units, voice recognition units, vibratory devices, computer mice, and any other suitable user interface.

The processor 510 and memory 530 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for generating payment authentication entry interfaces for shared user environments, the system comprising:
   a data storage device storing instructions for generating a shared augmented reality payment authentication entry interface in an electronic storage medium; and
   a processor configured to execute the instructions to perform a method including:
   determining, by an augmented reality processor, that a first proximity value of a first consumer device associated with a first user and a second proximity value of a second consumer device associated with a second user are each less than or equal to a proximity threshold value, based on first location data of the first consumer device and second location data of the second consumer device;
   receiving, by the augmented reality processor and from the first consumer device, a first request for a first payment authorization of one or more first products;
   receiving, by the augmented reality processor and from the second consumer device, a second request for a second payment authorization of one or more second products;
   transmitting, by the augmented reality processor and to the first consumer device, a first augmented reality interface based on the first request for the first payment authorization and based on determining that the first proximity value of the first consumer device and the second proximity value of the second consumer device are each less than or equal to a proximity threshold value;
   transmitting, by the augmented reality processor and to the second consumer device, a second augmented reality interface based on the second request for the second payment authorization and based on determining that the first proximity value of the first consumer device and the second proximity value of the second consumer device are each less than or equal to a proximity threshold value, wherein a display configuration of the second augmented reality interface is different from a display configuration of the first augmented reality interface, and wherein the display configuration of the first augmented reality interface comprises a first unique randomized display of input characters, and wherein the display configuration of the second augmented reality interface comprises a second unique randomized display of the input characters;

receiving, by the augmented reality processor and from the first consumer device, first payment credentials data input into the first augmented reality interface; and receiving, by the augmented reality processor and from the second consumer device, second payment credentials data input into the second augmented reality interface.

2. The system of claim 1, wherein the first consumer device is a separate device from the second consumer device.

3. The system of claim 1, wherein the display configuration of the first augmented reality interface and the display configuration of the second augmented reality interface each depict the input characters positioned in randomized placements using an augmented reality environment.

4. The system of claim 3, wherein the method further includes:
applying, by the augmented reality processor, one or more animations to the input characters, wherein the one or more animations include movements of the input characters within the augmented reality environment.

5. The system of claim 1, wherein the first augmented reality interface and the second augmented reality interface each comprise a unique augmented reality display or a unique augmented reality overlay of the input characters positioned in a randomized order in a physical environment, or a unique augmented reality overlay of the input characters positioned in a randomized order projected onto a physical object.

6. The system of claim 1, wherein the first payment credentials data and the second payment credentials data are input via a user-interaction with the first augmented reality interface and the second augmented reality interface, respectively, wherein the user interaction includes one of: a gesture, drag and drop motion, a grabbing motion, a wave, a click, or a point.

7. The system of claim 6, wherein the first payment credentials data are stored by the first consumer device and the second payment credentials data are stored by the second consumer device.

8. The system of claim 1, wherein the first payment credentials data and the second payment credentials data each comprise a form of user personal identification.

9. A computer-implemented method for generating payment authentication entry interfaces for shared user environments, the method comprising:
determining, by an augmented reality processor, that a first proximity value of a first consumer device associated with a first user and a second proximity value of a second consumer device associated with a second user are each less than or equal to a proximity threshold value, based on first location data of the first consumer device and second location data of the second consumer device;
receiving, by the augmented reality processor and from the first consumer device, a first request for a first payment authorization of one or more first products;
receiving, by the augmented reality processor and from the second consumer device, a second request for a second payment authorization of one or more second products;
transmitting, by the augmented reality processor and to the first consumer device, a first augmented reality interface based on the first request for the first payment authorization and based on determining that the first proximity value of the first consumer device and the second proximity value of the second consumer device are each less than or equal to a proximity threshold value;
transmitting, by the augmented reality processor and to the second consumer device, a second augmented reality interface based on the second request for the second payment authorization and based on determining that the first proximity value of the first consumer device and the second proximity value of the second consumer device are each less than or equal to a proximity threshold value, wherein a display configuration of the second augmented reality interface is different from a display configuration of the first augmented reality interface, and wherein the display configuration of the first augmented reality interface comprises a first unique randomized display of input characters, and wherein the display configuration of the second augmented reality interface comprises a second unique randomized display of the input characters;
receiving, by the augmented reality processor and from the first consumer device, first payment credentials data input into the first augmented reality interface; and
receiving, by the augmented reality processor and from the second consumer device, second payment credentials data input into the second augmented reality interface.

10. The method of claim 9, wherein the first consumer device is a separate device from the second consumer device.

11. The method of claim 9, wherein the display configuration of the first augmented reality interface and the display configuration of the second augmented reality interface each depict the input characters positioned in randomized placements using in an augmented reality environment.

12. The method of claim 11, wherein the first augmented reality interface and the second augmented reality interface each comprise a unique augmented reality display or a unique augmented reality overlay of the input characters positioned in a randomized order in a physical environment, or a unique augmented reality overlay of the input characters positioned in a randomized order projected onto a physical object.

13. The method of claim 11, further comprising:
applying, by the augmented reality processor, one or more animations to the input characters, wherein the one or more animations include movements of the input characters within the augmented reality environment.

14. The method of claim 9, wherein the first payment credentials data and the second payment credentials data are input via a user-interaction with the first augmented reality interface and the second augmented reality interface, respectively, wherein the user interaction includes one of: a gesture, drag and drop motion, a grabbing motion, a wave, a click, or a point.

15. The method of claim 14, wherein the first payment credentials data are stored by the first consumer device and the second payment credentials data are stored by the second consumer device.

16. The method of claim 9, wherein the first payment credentials data and the second payment credentials data each comprise a form of user personal identification.

17. A non-transitory machine-readable storage medium storing instructions that, when executed by a server, cause the server to perform a method for generating payment authentication entry interfaces for shared user environments, the method including:

determining, by an augmented reality processor, that a first proximity value of a first consumer device associated with a first user and a second proximity value of a second consumer device associated with a second user are each less than or equal to a proximity threshold value, based on first location data of the first consumer device and second location data of the second consumer device;

receiving, by the augmented reality processor and from the first consumer device, a first request for a first payment authorization of one or more first products;

receiving, by the augmented reality processor and from the second consumer device, a second request for a second payment authorization of one or more second products;

transmitting, by the augmented reality processor and to the first consumer device, a first augmented reality interface based on the first request for the first payment authorization and based on determining that the first proximity value of the first consumer device and the second proximity value of the second consumer device are each less than or equal to a proximity threshold value;

transmitting, by the augmented reality processor and to the second consumer device, a second augmented reality interface based on the second request for the second payment authorization and based on determining that the first proximity value of the first consumer device and the second proximity value of the second consumer device are each less than or equal to a proximity threshold value, wherein a display configuration of the second augmented reality interface is different from a display configuration of the first augmented reality interface, and wherein the display configuration of the first augmented reality interface comprises a first unique randomized display of input characters, and wherein the display configuration of the second augmented reality interface comprises a second unique randomized display of the input characters;

receiving, by the augmented reality processor and from the first consumer device, first payment credentials data input into the first augmented reality interface; and receiving, by the augmented reality processor and from the second consumer device, second payment credentials data input into the second augmented reality interface.

18. The non-transitory machine-readable storage medium of claim 17, wherein the first consumer device is a separate device from the second consumer device.

19. The non-transitory machine-readable storage medium of claim 17, wherein the display configuration of the first augmented reality interface and the display configuration of the second augmented reality interface each depict the input characters positioned in randomized placements using an augmented reality environment.

20. The non-transitory machine-readable storage medium of claim 17, wherein the first augmented reality interface and the second augmented reality interface each comprise a unique augmented reality display or a unique augmented reality overlay of the input characters positioned in a randomized order in a physical environment, or a unique augmented reality overlay of the input characters positioned in a randomized order projected onto a physical object.

\* \* \* \* \*

UNITED STATES PATENT AND TRADEMARK OFFICE
CERTIFICATE OF CORRECTION

| | | |
|---|---|---|
| PATENT NO. | : 12,154,094 B2 | Page 1 of 1 |
| APPLICATION NO. | : 18/052041 | |
| DATED | : November 26, 2024 | |
| INVENTOR(S) | : Charlotte Spender | |

It is certified that error appears in the above-identified patent and that said Letters Patent is hereby corrected as shown below:

In the Claims

In Column 13, Line 36, Claim 6, delete "user-interaction" and insert --user interaction--.

In Column 14, Line 38, Claim 11, after "using" delete "in".

In Column 14, Line 54, Claim 14, delete "user-interaction" and insert --user interaction--.

Signed and Sealed this
Seventh Day of January, 2025

Derrick Brent
*Acting Director of the United States Patent and Trademark Office*